(12) United States Patent
Ravisankar et al.

(10) Patent No.: US 12,439,125 B2
(45) Date of Patent: Oct. 7, 2025

(54) SYSTEMS AND METHODS FOR AUTOMATIC CONTENT RECOGNITION

(71) Applicant: Comcast Cable Communications, LLC, Philadelphia, PA (US)

(72) Inventors: Arun Ravisankar, Philadelphia, PA (US); Julianne Heinzmann, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 18/161,178

(22) Filed: Jan. 30, 2023

(65) Prior Publication Data
US 2024/0259635 A1      Aug. 1, 2024

(51) Int. Cl.
*H04N 21/466*     (2011.01)
*H04N 21/45*      (2011.01)
*H04N 21/472*     (2011.01)
*H04N 21/6587*    (2011.01)
*H04N 21/84*      (2011.01)
*H04N 21/845*     (2011.01)

(52) U.S. Cl.
CPC ..... *H04N 21/4668* (2013.01); *H04N 21/4532* (2013.01); *H04N 21/47217* (2013.01); *H04N 21/6587* (2013.01); *H04N 21/84* (2013.01); *H04N 21/845* (2013.01)

(58) Field of Classification Search
CPC .......... H04N 21/4668; H04N 21/4532; H04N 21/47217; H04N 21/6587; H04N 21/84; H04N 21/845; H04N 21/44008
USPC .......................................................... 725/46
See application file for complete search history.

(56) References Cited

U.S. PATENT DOCUMENTS

| | | | |
|---|---|---|---|
| 2015/0180989 A1* | 6/2015 | Seth ................... | G06Q 30/0276 709/224 |
| 2016/0148159 A1* | 5/2016 | Coffing .................. | G06Q 10/10 705/301 |
| 2017/0374429 A1* | 12/2017 | Yang ........................ | H04N 7/08 |
| 2018/0035074 A1* | 2/2018 | Barnes, Jr. .......... | H04N 1/00244 |
| 2018/0220168 A1* | 8/2018 | Han ................... | H04N 21/6581 |
| 2024/0040201 A1* | 2/2024 | Lee ........................ | G06F 3/0482 |

FOREIGN PATENT DOCUMENTS

WO     WO-2015099824 A2 *  7/2015    ........... G06F 16/958

* cited by examiner

*Primary Examiner* — Adil Ocak
(74) *Attorney, Agent, or Firm* — Ballard Spahr LLP

(57) ABSTRACT

Methods, apparatuses, and systems are described for determining content being output by a device. One or more images of content being output on the device may be determined. The one or more images may be analyzed to determine text data displayed in the one or more images. The text data may be used to determine the content being output by the device.

20 Claims, 10 Drawing Sheets

Watch With Me App Sign Out — 402

SEARCH RESULTS — 410
*For: popular comedy shows*

Results: 6 shows — 420

430:
- The Apprentice
- 30 Rock
- The Office
- Community
- Modern Family
- The Tonight Show 440:
30 mins. long The Office: "Dundee Awards"
Michael (Steve Carell) holds an event after work and gives ridiculous awards to employees . . . (more info)

PLAY NOW    MORE INFO

Related Items: — 450
- The Office Video Game — 452
- The Office Shop — 454
- NBC App — 456
- Silly Jokes App — 458

SYSTEMS AND METHODS FOR AUTOMATIC CONTENT RECOGNITION

BACKGROUND

Conventional content recognition solutions use either audio or video fingerprints that are matched in a library, or database, populated with reference fingerprints associated with a plurality of content items. However, these conventional content recognition solutions require extensive resources to receive the audio/video fingerprints from user devices and compare the fingerprints to the reference audio/video fingerprints stored on one or more servers in order to recognize content being output at a user device. Thus, conventional content recognition solutions depend on video and/or audio databases stored on a server or in the cloud to process several frames of content at a time in order to determine the particular content item being watched on the user devices. In addition, conventional solutions require the use of extensive computational resources in order to perform the content recognition algorithm(s) to process the audio/video fingerprints received from the user device at the server.

SUMMARY

It is to be understood that both the following general description and the following detailed description are exemplary and explanatory only and are not restrictive. Methods, systems, and apparatuses systems for improved content streaming are described.

A device (e.g., a network device, a user device, etc.) connected to a network may generate and/or maintain images of content being output on the device. The images may be analyzed to determine the content being output on the device. This information may be used to determine viewing history information associated with a user or the device, which may be further used to determine viewership statistics and/or recommend content based on the user or the device.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein:

FIGS. 4A-4B show example user interface scenarios for determining images of content being output on a device.

DETAILED DESCRIPTION

Figure 1:
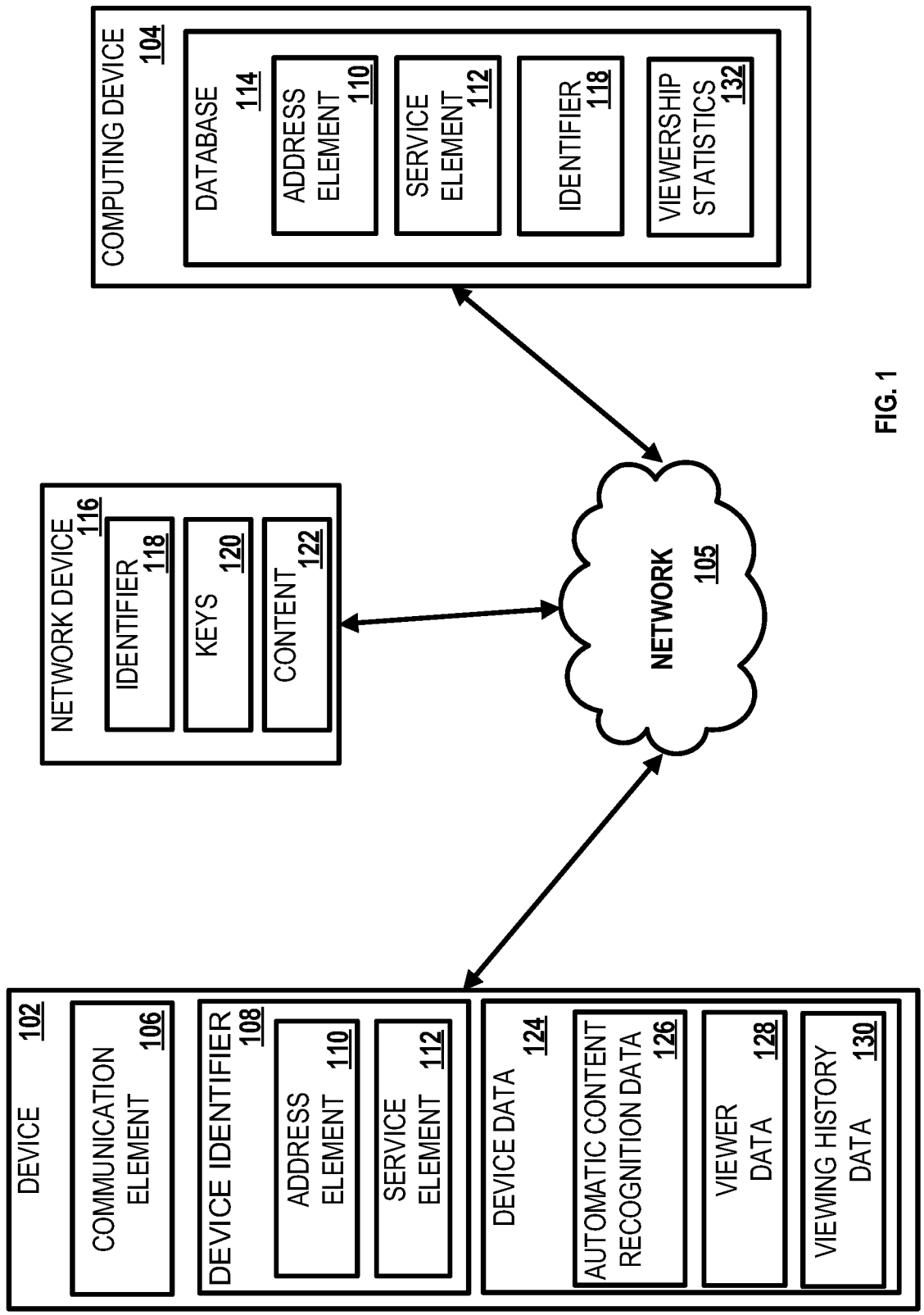
FIG. 1 shows an example system environment.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

FIG. 1 shows an example system 100 for processing images of content being output on a device (e.g., a device 102, network device 104). For example, the system 100 may be configured to determine one or more images (e.g., screenshots) of content being output on a display of the device (e.g., display of the device 102). The system 100 may be configured to provide services, such as network-related services, to the device. The network and system may comprise a device 102 in communication with a computing device 104, such as a server, via a network 105. The computing device 104 may be disposed locally or remotely relative to the device 102. As an example, the device 102 and the computing device 104 can be in communication via a private and/or public network 105 such as the Internet or a local area network (LAN). Other forms of communications can be used such as wired and wireless telecommunication channels, for example.

The device 102 may comprise a user device and/or a network device. The user device may comprise an electronic device such as a smart television, a computer, a smartphone, a laptop, a tablet, a set top box, a display device, or other device capable of communicating with the computing device 104.

The device 102 may comprise a communication element 106 for providing an interface to a user to interact with the device 102 and/or the computing device 104. The communication element 106 can be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces can be used to provide communication between the user and one or more of the device 102 and the computing device 104. As an example, the communication element 106 can request or query various files from a local source and/or a remote source. As an example, the communication element 106 can transmit data to a local or remote device such as the computing device 104.

The device 102 may be associated with a user identifier or a device identifier 108. As an example, the device identifier 108 may be any identifier, token, character, string, or the like, for differentiating one user or user device (e.g., device 102) from another user or user device. In an example, the device identifier 108 may identify a user or user device as belonging to a particular class of users or user devices. As an example, the device identifier 108 may comprise information relating to the device 102 such as a manufacturer, a model or type of device, a service provider associated with the device 102, a state of the device 102, a locator, and/or a label or classifier. Other information can be represented by the device identifier 108.

The device identifier 108 may comprise an address element 110 and a service element 112. In an example, the address element 110 can comprise or provide an internet protocol address, a network address, a media access control (MAC) address, international mobile equipment identity (IMEI) number, international portable equipment identity (IPEI) number, an Internet address, or the like. As an example, the address element 110 can be relied upon to establish a communication session between the device 102 and the computing device 104 or other devices and/or networks. As an example, the address element 110 can be used as an identifier or locator of the device 102. In an example, the address element 110 can be persistent for a particular network.

The service element 112 may comprise an identification of a service provider associated with the device 102, with the class of device 102, and/or with a particular network 105 with which the device 102 is currently accessing services associated with the service provider. The class of the device 102 may be related to a type of device, capability of device, type of service being provided, and/or a level of service (e.g., business class, service tier, service package, etc.). As an example, the service element 112 may comprise information relating to or provided by a communication service provider (e.g., Internet service provider) that is providing or enabling data flow such as communication services to the device 102. As an example, the service element 112 may comprise information relating to a preferred service provider for one or more particular services relating to the device 102. In an example, the address element 110 can be used to identify or retrieve data from the service element 112, or vice versa. As an example, one or more of the address element 110 and the service element 112 may be stored remotely from the device 102 and retrieved by one or more devices such as the device 102 and the computing device 104. Other information may be represented by the service element 112.

The device 102 may include, generate, or store device data 124 (e.g., automatic content recognition (ACR) data, content viewership data, etc.). The device data 124 may include ACR data 126, viewer data 128, and viewing history data 130. For example, the device 102 may use an ACR technique to gather audience data with respect to various content items (e.g., application programs, content programs, etc.) being output, or consumed, by the device 102. For example, the device 102 may not have access to an application's data that indicates the content being output by the application. Thus, the device 102 may determine one or more images (e.g., one or more screenshots) of content being output on the device 102 at one or more time points while a user is interacting with the content being output on the device 102. For example, the device 102 may determine, or capture, an image (e.g., screenshot) each time a user provides an input (e.g., clicking an application button of the application's user interface) during the output of the content on the device 102. In an example, the application may output, at the one or more time points, data that identifies a content item. For example, the data may comprise metadata comprising data indicative of the content item.

As an example, the one or more time points may comprise one or more of a time associated with an initiation of the application, a time associated with a duration after the initiation of the application, a time associated with an initiation of an output of a content item associated with the application, or a time associated with a user interaction of the application.

As an example, the one or more time points may be determined based on data, or information, associated with an application initiated on the device 102. The data, or information, may comprise one or more of a type of application, a classification of the application, or an identifier of the application. For example, the device 102 may receive the data associated with the application when the application is initiated on the device 102. Additionally, an image of content being output by the device 102 may be determined based on the initiation of the application. An optical content recognition (OCR) technique may be performed on the image to determine the application data. For example, text data (e.g., one or more logos, text information, caption data, one or more content descriptors, etc.) output in the content being output on the device 102 may be identified using the OCR technique and compared with a library of content in order to determine the application data. In an example, the library of content may be stored on the user device 102, on a cloud computing device, in a database, etc. The one or more time points may be determined based on the OCR results of the image indicating the application data. For example, a quantity of user inputs may be used in order to access menu items depending on the application being used to access content. Thus, the one or more time points may be associated with the quantity of user inputs or a type of user input associated with the quantity of user inputs.

As an example, the one or more time points may be determined based on a user input causing the output of content on the device 102. For example, the user input may comprise one or more of a play command, a rewind command, a pause command, or a forward command. For example, each time point may be associated with a user input associated with a play command.

As an example, the one or more time points may be determined based on data, or information, associated with the content output on the device 102, wherein the content is output on the device 102 based on receiving a user input. For example, the data, or information, associated with the content output on the device 102 may comprise one or more of a type of content, a category of content, a genre of content, or an identifier of the content. For example, an image of content output on the device 102 may be determined based on receiving the user input. An OCR technique may be performed on the image to determine the content data. For example, text data (e.g., one or more logos, text information, caption data, one or more content descriptors, etc.) output in the content being output on the device 102 may be identified using the OCR technique and compared with a library of content stored on the user device 102 in order to determine the content data. The one or more time points may be determined based on the OCR results of the image indicating the data associated with the content being output on the device 102.

The device 102 may determine one or more images of content being output by the device 102 at the one or more time points. For example, the one or more images may be captured by the device 102. In an example, the one or more images of content being output may be determined at the initiation of the application, a duration after the initiation of the application, or an initiation of an output of a content item associated with the application. For example, the device 102 may not have access to an applications data that indicates the content being output by the application. In an example, the device 102 may generate one or more screenshots of the content being output on the device 102 at the one or more time points. Text data (e.g., one or more logos, text information, caption data, one or more content descriptors, etc.) associated with the content being output on the device 102 may be determined based on the one or more images. The content being output on the device 102 may be identified based on the text data. For example, the text data output with the content may be determined using OCR techniques and compared with a library of content (e.g., stored on the user device 102, at a cloud computing device, at a database, etc.) in order identify the content being output on the device 102. As an example, information indicative of the identification of the content being output by on the device 102 may be stored as ACR data 126 on the device 102 along with viewer data 128 for determining and updating viewing history information 130. As an example, the text data may also be included as ACR data 126 on the device 102 along with viewer data 128 for determining and updating the viewing history information 130.

The device 102 may receive the viewer data 128 from a viewership data provider such as a smart television content viewership data provider and associate the viewer data 128 with the ACR data 126. In an example, the device 102 may determine, or generate, viewer data 128 based on one or more user profiles associated with the device 102. For example, the viewer data 128 may comprise one or more of user profile data, user attribute data, or content recommendation profile data. As content is identified, the ACR data 126 may be associated with the viewer data 128 to determine and/or update viewing history information 130. The viewing history data 130 may comprise viewership statistics associated with a user of the device 102 or the device 102. For example, the viewership statistics may include one or more of viewing durations for one or more content items, user interaction durations associated with accessing one or more applications, or information indicative of the one or more content items output by the device 102. In an example, the smart television content viewership provider may use the ACR data 126 to associate the viewer data 128 with respect to content (e.g., application interface, application menu options, content items, etc.) being output by the device 102. For example, the viewing history data 130 may be updated based on the identification of content being output by the device 102 from the ACR data 126. As an example, based on the identification of content being output on the device 102, a content recommendation may be provided to the device 102. As an example, viewing history data 130 considered by a content recommendation profile may be updated based on the identification of content being output on the device 102.

The computing device 104 may comprise a server for communicating with the device 102 and/or the network device 116. As an example, the computing device 104 may communicate with the device 102 for providing data and/or services. As an example, the computing device 104 may provide services, such as network (e.g., Internet) connectivity, network printing, media management (e.g., media server), content services, streaming services, broadband services, or other network-related services. As an example, the computing device 104 may allow the device 102 to interact with remote resources, such as data, devices, and files. As an example, the computing device 104 may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may be configured to manage the communication between the device 102 and a database 114 for sending and receiving data therebetween. As an example, the database 114 may store a plurality of files (e.g., web pages), user identifiers or records (e.g., viewership statistics 132), or other information. As an example, the device 102 may request and/or retrieve a file from the database 114. In an example, the database 114 may store information relating to the device 102 such as the address element 110, the service element 112, and/or viewership statistics 132. As an example, the computing device 104 may obtain the device identifier 108 from the device 102 and retrieve information from the database 114 such as the address element 110, the service element 112, and/or viewership statistics 132. As an example, the computing device 104 may obtain the address element 110 from the device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 or some other device or system.

The computing device 104 may be configured to determine viewership statistics 132 for one or more devices (e.g., device 102). For example, the computing device 104 may be configured to receive viewing history data 130 from one or more devices (e.g., device 102) and store the information in the database 114 as viewership statistics 132. The viewership statistics 132 may be aggregated/organized according to user profile data from various user devices or locations. As an example, the computing device 104 may receive the viewing history data 130, along with the device identifier 108 associated with the device 102 associated with the viewing history data 130, and store the viewing history data 130 according to the device identifier 108. As an example, the computing device 104 may be configured to receive the ACR data 126 and the viewer data 128. The computing device 104 may associate the ACR data 126 with the viewer data 128 to determine and/or update the viewing history information 130. For example, the computing device 104 may update the viewing history information 130 based on the identification of content being output by the device 102 from the ACR data 126. For example, based on the identification of content being output on the device 102, the computing device 104 may provide a content recommendation to the device 102. As an example, the computing device 104 may update viewing history information 130 considered by a content recommendation profile based on the identification of the content being output on the device 102.

In an example, a network device 116 may be in communication with a network, such as the network 105. For example, the network device 116 may facilitate the connection of a device (e.g., device 102) to the network 105. As an example, the network device 116 may be configured as a set-top box, a gateway device, or wireless access point (WAP). In an example, the network device 116 may be configured to allow one or more wireless devices to connect to a wired and/or wireless network using Wi-Fi, Bluetooth®, Zigbee®, or any desired method or standard. As an example, the network device 116 may be configured to receive the viewing history data 130 and the device identifier 108 from the device 102, wherein the network device 116 may forward the viewing history data 130 and the device identifier 108 to the computing device 104. As an example, the network device 116 may be configured to receive the ACR data 126 and the viewer data 128. The network device 116 may associate the ACR data 126 with the viewer data 128 to determine and/or update the viewing history information 130. For example, the network device 116 may update the viewing history information 130 based on the identification of content being output by the device 102 from the ACR data 126. For example, based on the identification of content being output on the device 102, the network device 116 may provide a content recommendation to the device 102. As an example, the network device 116 may receive the content recommendation from the computing device 104 in response to sending the viewing history information 130, the ACR data 126, and/or the viewing history data 130 to the computing device 104. As an example, the network device 116 may update viewing history information 130 considered by a content recommendation profile based on the identification of the content being output on the device 102.

The network device 116 may comprise an identifier 118. As an example, the identifier 118 may be or relate to an Internet Protocol (IP) Address (e.g., IPV4/IPV6) or a media access control address (MAC address) or the like. As an example, the identifier 118 may be a unique identifier for facilitating communications on the physical network segment. In an example, the network device 116 may comprise a distinct identifier 118. As an example, the identifier 118 may be associated with a physical location of the network device 116.

Figure 2:
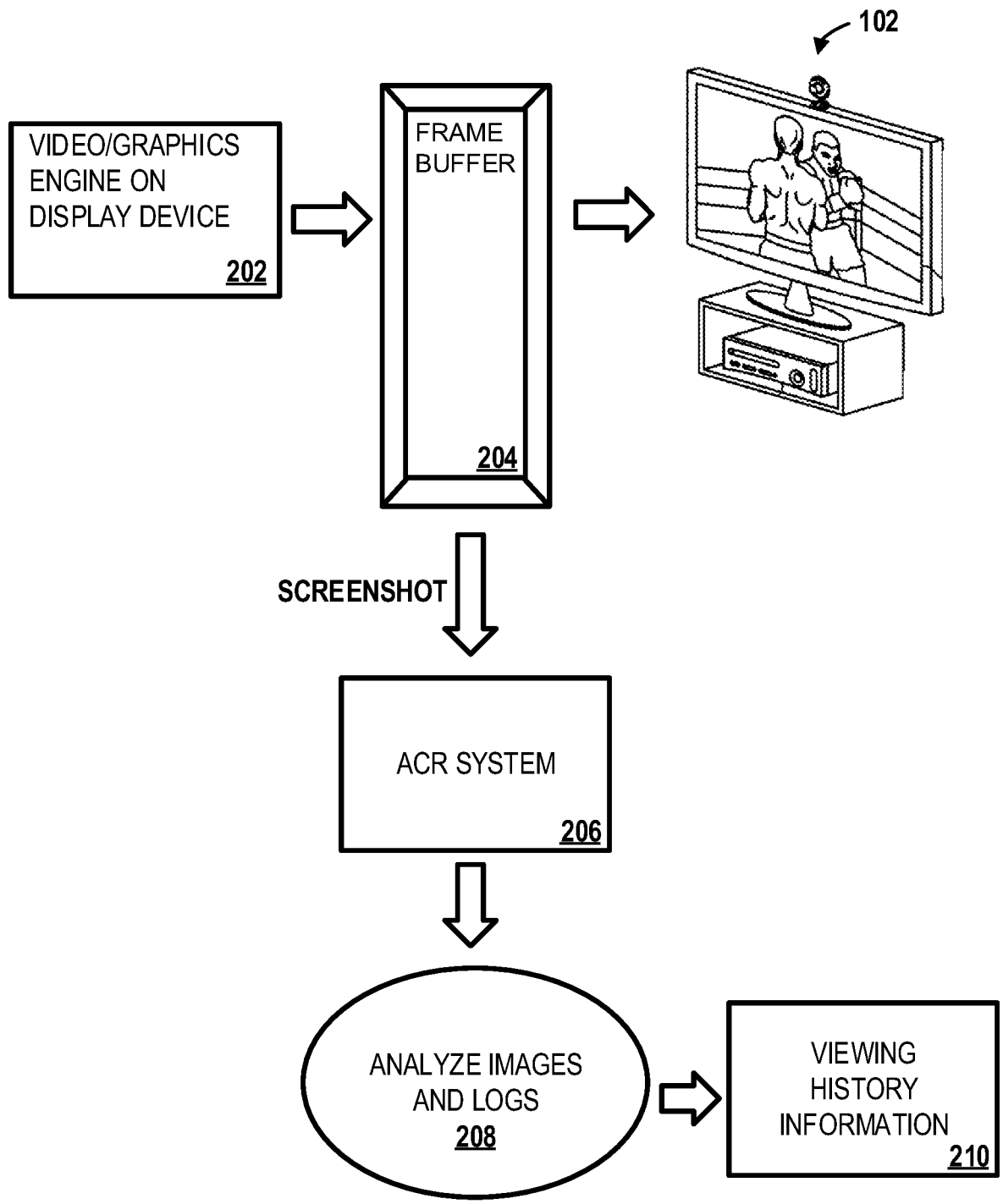
FIG. 2 shows an example system environment.

FIG. 2 shows an example ACR process for identifying content being output on a device 102. For example, images (e.g., frames) of content being output on the device 102 may be received at a frame buffer 204 from a video/graphics engine 202 of the device 102. The device 102 may determine one or more time points for which to determine, or capture, the one or more images (e.g., screenshots) of content being output on the device 102. For example, taking too many screenshots while the content is being output may increase the latency, or processing time, associated with determining one or more content items being output by the application. In addition, some of the screenshots may include similar images of other screenshots, while other screenshots may include information that may not be useful in identifying the content item being output by the application. Thus, by taking screenshots based on the application being used, based on one or more user commands, or based on the type of contenting being output, the device 102 may increase the chances that the screenshots being taken include useful information for identifying the content item being output and reduce the time it takes to identify the content item being output. As an example, the one or more time points may be determined based on one or more of a type of, a classification of, or an identifier of the application currently in use on the device 102. As an example, the one or more time points may be based on a user input such as one or more of a play command, a rewind command, a pause command, or a forward command. As an example, the one or more time points may be based on one or more of a type of, a category of, or a genre of the content (e.g., content item, video content, etc.) being output on the device 102. The one or more images may be determined based on a screenshot at the one or more time points of the content as the content is being received at the frame buffer 204. The one or more images of the content being output on the device 102 may be processed by an ACR system 206. For example, the ACR system 206 may perform one or more ACR techniques on the received images. For example, an optical content recognition (OCR) technique may be performed on the image to determine text data (e.g., one or more logos, text information, caption data, one or more content descriptors, etc.) of the content being output by the device 102. For example, the images may be analyzed, at 208, wherein text data output with the content being output by the device 102 may be identified and compared with a library of content stored on the user device 102 in order to identify the content being output on the device 102. As an example, based on the identification of the content being output on the device 102, the ACR system 206 may update viewing history data/information 210. As an example, the ACR system 206 may cause a content recommendation on the device 102 based on the identification of the content being output on the device 102. As an example, the device 102 may update viewing history data/information 130 considered by a content recommendation profile based on the identification of the content being output on the device 102.

Figure 3:
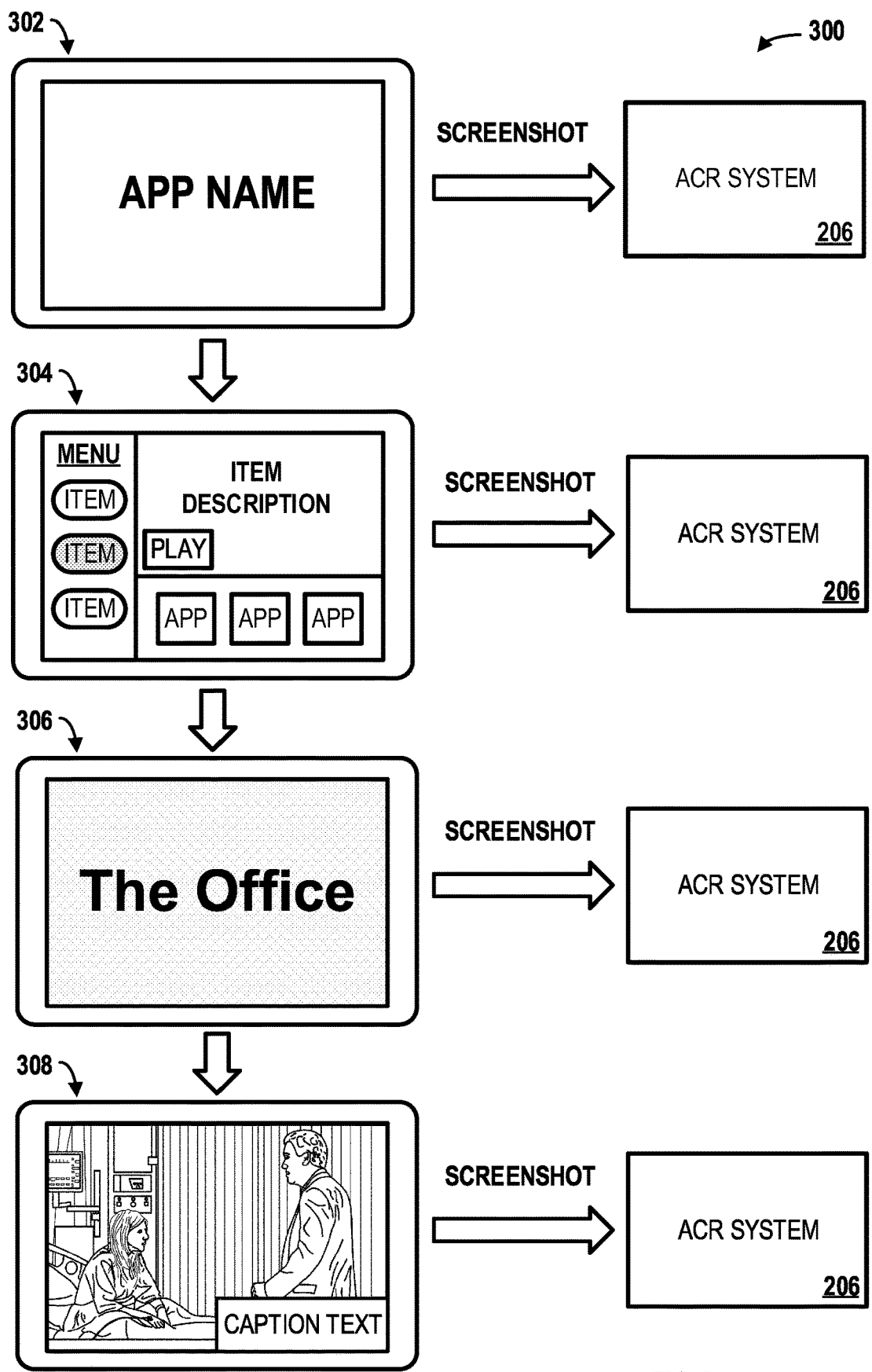
FIG. 3 shows an example screenshot process.

FIG. 3 shows an example process 300 for generating screenshots of the content being output on by a user device. At 302, an application may be initiated (e.g., launched). For example, the application may be initiated on a device, wherein the application may cause content to be output on the device. For example, the application may comprise one or more of a video streaming application, a game application, a social media application, a fitness application, a service application, and the like. For example, the device may comprise one or more of a smart television, a computer, a smartphone, a laptop, a tablet, a set top box, and the like. A title of the application may be output at and/or during the initiation of the application. Based on the initiation of the application, a screenshot of the content being output may be generated. The screenshot may be processed to determine the content being output when the screenshot was generated. For example, based on the screenshot, the content being output at the initiation of the application may be determined to include text from the application's title. Based on one or more ACR techniques, the text output in the screenshot may be compared to a library of content to determine that the text is associated with an identifier (e.g., the title) of the application. In an example, the screenshot may be processed by an ACR system 206 implemented on the device, wherein the ACR system 206 may perform the one or more ACR techniques to compare the text output in the screenshot to the library of content and determine that the text is associated with the identifier (e.g., title) of the application. After the application's initiation, the application may output a menu screen with various options at 304.

At 304, the application may output a list of menu options, a list of applications, and a preview section that shows an item description of a selected item and an option to play the selected item. In an example, a screenshot of the content being output may be generated based on receiving user input causing the selection of the item. Based on the screenshot, the content being output at and/or during the user input may be determined to include text from the list of menu options, list of applications, and the item description in the preview section. Based on one or more ACR techniques, the text output in the screenshot may be compared to a library of content to determine that the text being output at and/or during the user input is associated with the content of the menu options, list of applications, and item description. In example, the screenshot may be processed by an ACR system 206 implemented on the device, wherein the ACR system 206 may perform the one or more ACR techniques to compare the text output in the screenshot to the library of content and determine that the text is associated with the content of the menu options, list of applications, and item description.

At 306, the application may output an initial scene (e.g. content item introduction) associated with a selected content item. For example, user input associated with a user selection, or play, command may cause the selected content item to be output. For example, as shown at 306, an introduction scene that includes the title (e.g., "The Office") of the selected content item may be initially output. Based on the user input (e.g., select command or play command), a screenshot of the content being output may be generated. For example, the screenshot may be generated at a time the user input is received or a time duration after the user input is received. Based on the screenshot, the content being output may be determined to include text data of the title output in the introduction scene. Based on one or more ACR techniques, the text output in the screenshot may be compared to a library of content to determine that the text being output in the content is associated with a particular type of content item or with a particular content item. For example, it may be determined that the text is associated with the show "The Office." In an example, the screenshot may be processed by an ACR system 206 implemented on the device, wherein the ACR system 206 may perform the one or more ACR techniques to compare the text output in the screenshot to the library of content and determine that the text is associated with the show the "The Office."

At 308, the application may continue to output content associated with the selected content item. For example, the main programming, or portion, of the content item may be output after the introduction scene. A screenshot of the content being output may be generated as the content is continuing to be output after the introduction. As an example, the screenshot may be generated based on the determination of the type of content item being output associated with the introduction scene. One or more subsequent screenshots may be generated at one or more intervals based on the type of content being output. For example, since it was determined that the content is associated with the show "The Office," one or more screenshots may be taken at one or more intervals in order to determine the particular episode of "The Office" that is being output. As an example, a screenshot may be generated based on the initial user input (e.g., play command). For example, the screenshot may be generated a time duration after the user input is received in order to determine that the content item being output is a particular episode of "The Office." For example, based on the screenshot, the content being output may be determined to include text from closed caption data. Based on one or more ACR techniques, the text output in the screenshot may be compared to a library of content to determine that the text being output in the content is associated with a particular video content item. For example, it may be determined that the text is associated with the particular episode of "The Office." In an example, the screenshot may be processed by an ACR system 206 implemented on the device, wherein the ACR system 206 may perform the one or more ACR techniques to compare the text output in the screenshot to the library of content and determine that the text is associated with the episode of "The Office."

Figure 4B:
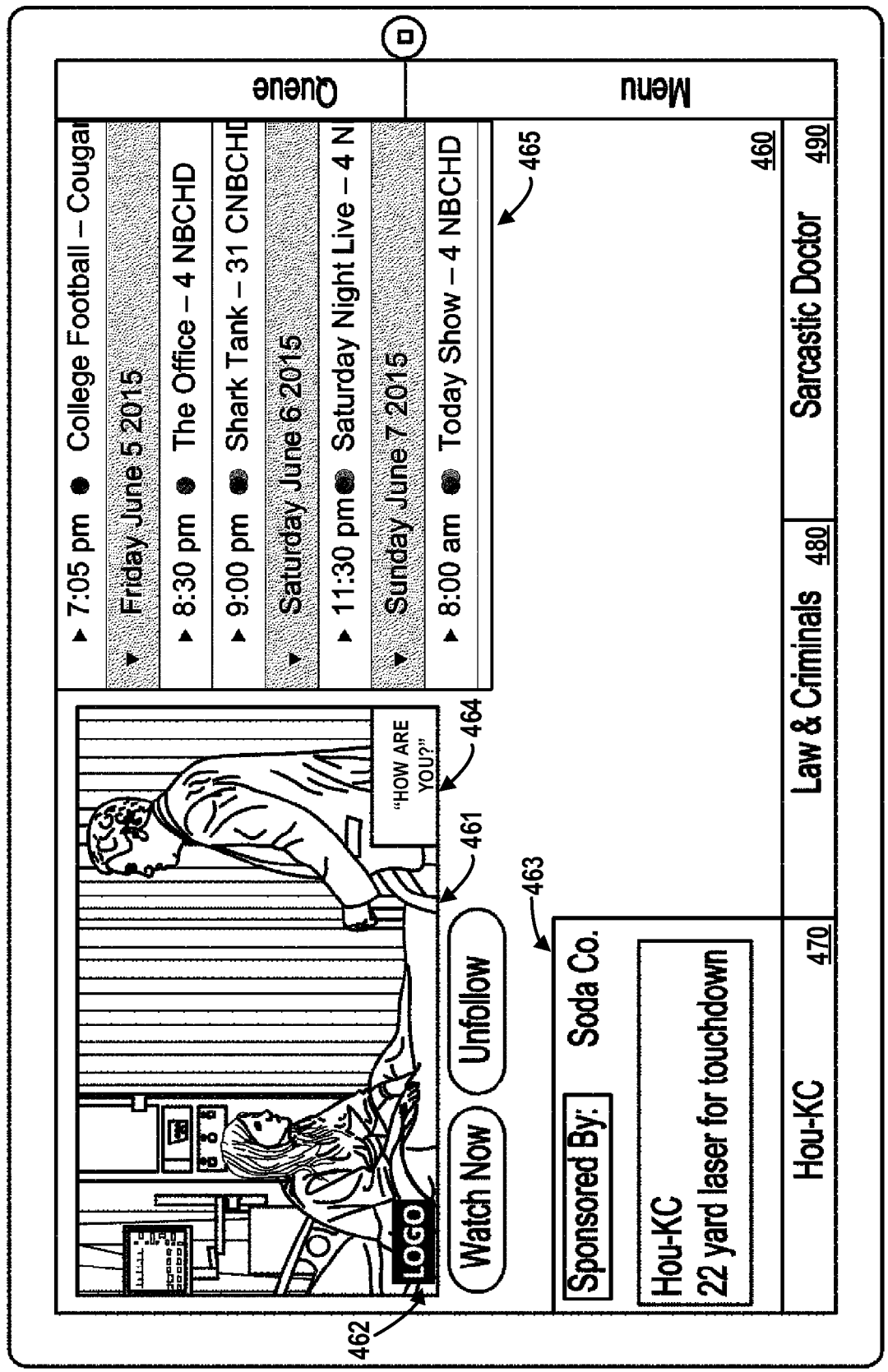

FIGS. 4A-4B show example user interfaces for determining one or more images of contenting output on the user device. FIG. 4A shows an example user interface 400 that may be output on a user device (e.g., television, tablet, smartphone, etc.). For example, a user may initiate the Watch With Me App 402, as shown in FIG. 4A. The user may provide a user input in the search window 410 to search for content items of interest, such as "popular comedy shows." The Watch With Me App 402 may return the top 6 results 420 in the results window 430, wherein the user may provide a selection of the show "The Office." The Watch With Me App 402 may then provide a brief description of the show, or episode, in the window 440, wherein the user may be provided with the options of either playing the selected show, "The Office," or selecting additional information. The user interface may further provide related items to the selected show in window 450. The related items may comprise one or more additional content items or applications such as The Office Video Game 452, The Office Shop 454, the NBC App 456, or the Silly Jokes App 458. In an example, a screenshot may be generated based on each user input. For example, a screenshot may be generated based on the user input in the search window 410 to search for content items of interest. Based on the screenshot, the Watch With Me App 402 may be identified as the application currently outputting content. Based on identifying the Watch With Me App 402, the user device may generate one or more screenshots of the content being output while the user interacts with the user interface of the Watch With Me App 402. For example, a screenshot may be taken at one or more time points based on the identification of the Watch With Me App 402. For example, the one or more time points may be associated with one or more of an initiation of the Watch With Me App 402, a duration after the initiation of the Watch With Me App 402, an initiation of a content item, or a user interaction with the Watch With Me App 402. The user device may determine text data (e.g., one or more logos, text information, caption data, one or more content descriptors, etc.) associated with the content being output on the user device. For example, the images of content being output by the Watch With Me App 402 may be analyzed using OCR techniques to determine the text data output in the images, such as the output of the "Watch With Me App" text 402 in window 410, the text of the results in window 430, the information description in window 440, or the text of the related items in window 450. The user device may determine the content being output on the user device based on the identification of the text data. For example, based on a screenshot of the content being output by the Watch With Me App 402, the user device may identify a user interaction associated with the Watch With Me App 402, such as the user's selection of the show "The Office." For example, the device may determine that the user input is associated with a selection of the show "The Office" based on identifying the text in the description window 440. The device may determine that the text in the description window 440 is related to the show "The Office," and thus, may be related to a user selection of "The Office" icon in window 430. The user device may then determine that the user may have an interest in comedy shows or shows similar to "The Office." As an example, the user device may then update the viewing history data/information based on the OCR results identifying the content being output on the user device. As an example, the user device may provide additional content recommendations based on the OCR results by outputting, for example, a pop-up window of the additional content recommendations. As an example, the user device may update viewing history information considered by a content recommendation profile based on the identification of the content being output on the user device.

FIG. 4B shows an example user interface that may be output on a user device (e.g., television, tablet, smartphone, etc.). For example, a user may initiate a content guide type application on the user device, as shown in FIG. 4B. The content guide application may output a user interface that includes a window 460 displaying a content item 461, an advertisement 463, a content guide 465 listing of available content items, a menu item 470 associated with the advertisement 463, a "Law & Criminals" 480 menu item, and a "Sarcastic Doctor" 490 menu item. In an example, a screenshot may be generated based on the user input initiating the content guide application. Based on the screenshot, text data associated with the content guide 465 may be used to identify the content guide application. Based on identifying the content guide application, the user device may generate one or more screenshots of the content being output while the user interacts with the user interface of the content guide application. For example, a screenshot may be taken at one or more time points based on the identification of the content guide application. For example, the one or more time points may be associated with one or more of an initiation of the content guide application, a duration after the initiation of the content guide application, or an initiation of a content item. The user device may determine text data (e.g., one or more logos, text information, caption data, one or more content descriptors, etc.) associated with the content being output on the user device. For example, the images of content being output by the content guide application may be analyzed using OCR techniques to determine the text data output in the images, such as the logo 462 or caption information 464 or the text information associated with the advertisement 463. The user device may determine the content being output on the user device based on the identification of the text data. In an example, based on a screenshot, text data associated with the logo 462 may be determined, wherein the logo may be identified based on comparing the text data with a library of content. In an example, the logo 465 may be identified based on the screenshot generated from the user input initiating the content guide application or based on the one or more screenshots generated from the user interactions with the user interface of the content guide application. Based on identifying the logo 462, the user device may determine the content item or content source associated with the logo 462 and determine that the user may have an interest in the content item or content source associated with the logo 462. As an example, the user device may then update the viewing history data/information based on the OCR results identifying the content being output on the user device. As an example, the user device may provide additional content recommendations based on the OCR results by outputting, for example, a pop-up window of the additional content recommendations. As an example, the user device may update viewing history information considered by a content recommendation profile based on the identification of the content being output on the user device.

Figure 5:
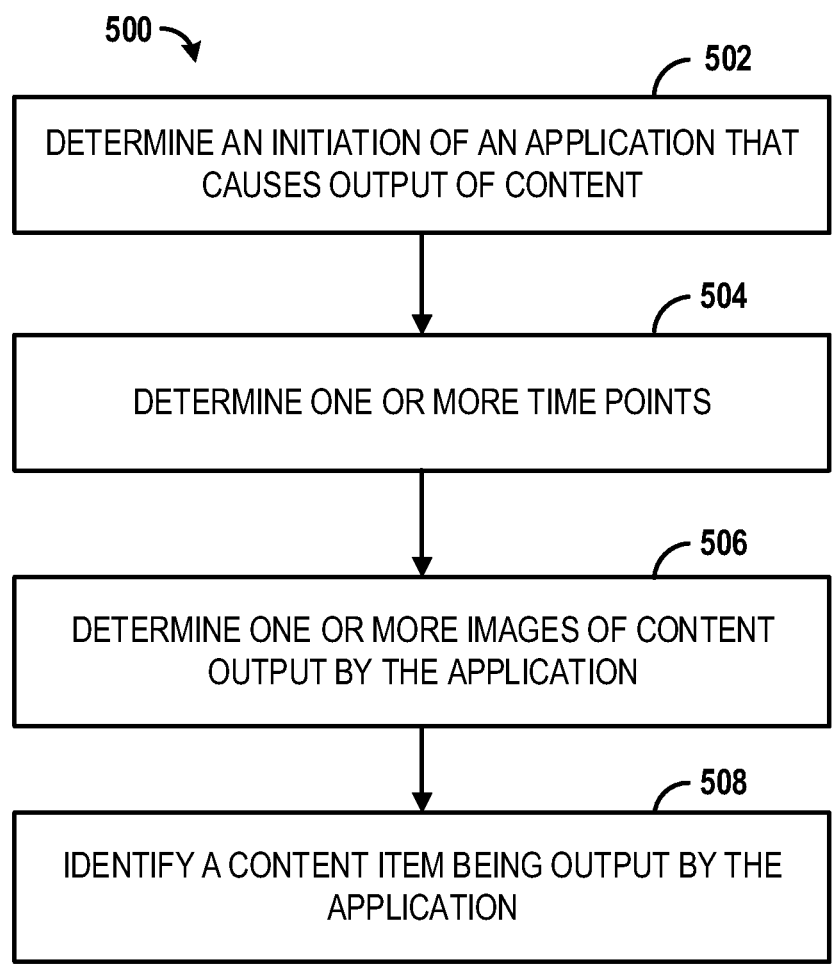
FIG. 5 shows a flowchart of an example method.

FIG. 5 shows an example method 500 for determining one or more of images of content being output. Method 500 may be implemented by the device 102, or the network device 116, or any combination thereof. For example, method 500 may be implemented by a user device comprising one or more of a smart television, a computer, a smartphone, a laptop, a tablet, or a set top box. At step 502, an initiation of an application that causes output of content may be determined. For example, the application may comprise one or more of a video streaming application, a game application, a social media application, a fitness application, or a service application. For example, the content being output by the application may comprise, one or more of a user interface, one or more options for selection, a menu, or one or more content items for selection. For example, a user input may be received that causes the initiation of the application. For example, a user device (e.g., device 102, network device 116, etc.) may receive the user input to initiate the application, wherein the application may cause the content to be output on the user device.

At step 504, one or more time points may be determined. For example, the one or more time points may be determined by the user device (e.g., device 102, the network device 116, etc.). The one or more time points may be determined based on data, or information, associated with the application. For example, the data associated with the application may comprise one or more of a type of application, a classification of the application, or an identifier of the application. In an example, the application may output, at the one or more time points, data that identifies a content item. For example, the data may comprise metadata comprising data indicative of the content item. As an example, the one or more time points may be determined based on a screenshot taken at the initiation of the application. For example, an image of the content being output may be generated based on the initiation of the application. An optical content recognition (OCR) technique may be performed on the image to determine the data associated with the application. For example, text data associated with the application may be identified using the OCR technique in order to determine the data associated with the application. For example, an OCR algorithm may compare the identified text in the content being output with a library of content to identify the content being output. In an example, the library of content may be stored on the user device (e.g., device 102, the network device 116, etc.), in a cloud computing device, in a database, etc. The text data may comprise one or more of one or more logos, text information, caption data, or one or more content descriptors. The data associated with the application may be determined based on the text data. The one or more time points may be determined based on the OCR results of the image indicating the data associated with the application. As an example, the one or more time points may comprise one or more of a time associated with the initiation of the application, a time associated with a duration after the initiation of the application, a time associated with an initiation of an output of a content item associated with the application, or a time associated with a user interaction of the application. As an example, a quantity of user inputs associated with causing the output of content may be determined based on the data associated with the application. The one or more time points may be determined based on the quantity of user inputs. For example, a quantity of user inputs may be required in order to access menu items depending on the application being used to access the content. Thus, one or more of the quantity of user inputs may be used for determining images (e.g., screenshots) of the content being output while a user interacts with the application.

At step 506, one or more images of the content being output may be determined. For example, one or more images of content being output may be determined by the user device (e.g., device 102, the network device 116, etc.). The one or more images of the content being output may be determined at the one or more time points. In an example, the one or more images may be captured at the one or more time points. In an example, one or more screenshots of the content being output may be generated at the one or more time points. The one or more images may be determined based on the one or more screenshots.

At step 508, a content item being output by the application may be identified based on the one or more images. For example, the content item may be identified by the user device (e.g., device 102, the network device 116, etc.) based on the one or more images. For example, one or more screenshots may be analyzed to determine text data associated with the content item output by the application. The text data may comprise one or more of one or more logos, text information, captions, or one or more content descriptors. The content item being output may be identified based on the text data. For example, an image of content may be analyzed using OCR techniques to identify the text data output with the content, and thus, identify the content item being output by the application. For example, an OCR algorithm may compare the identified text data output in the content with a library of content to identify the content item being output by the application. In an example, the library of content may be stored on the user device (e.g., device 102, the network device 116, etc.), in a cloud computing device, in a database, etc. As an example, viewing history information may be determined. The viewing history information may be updated with the identification of the content being output. In an example, a content recommendation may be provided based on the identification of the content being output. In an example, viewing history information considered by a content recommendation profile may be updated based on the identification of the content being output.

Figure 6:
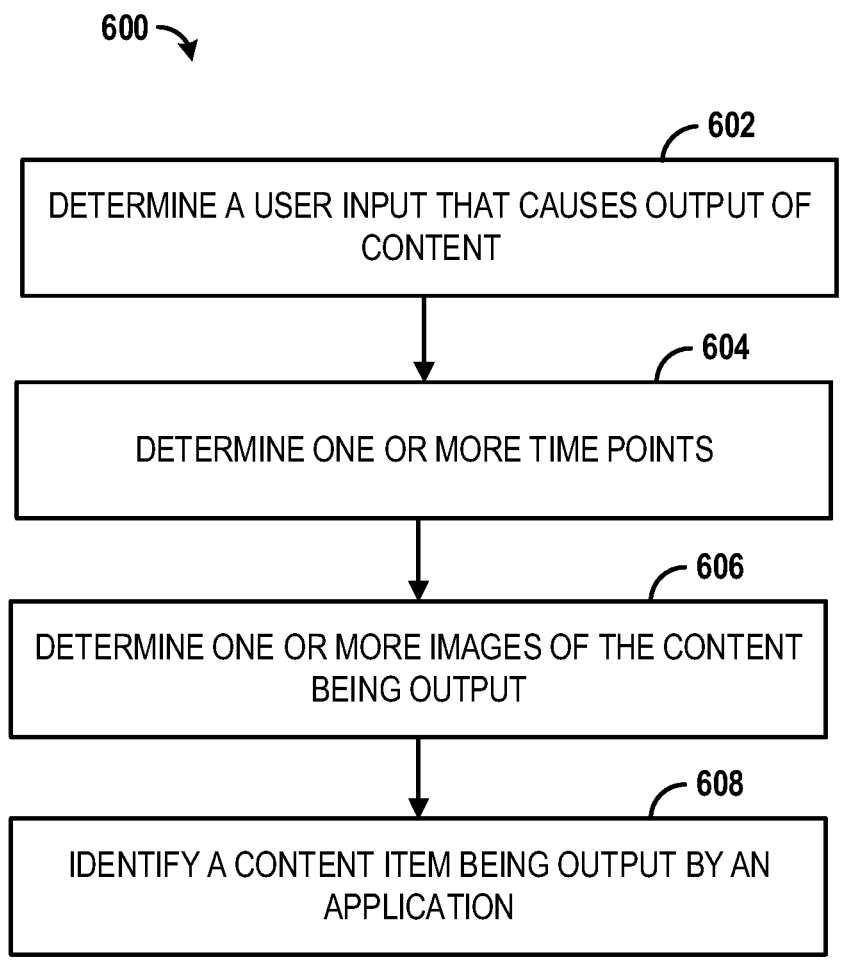
FIG. 6 shows a flowchart of an example method.

FIG. 6 shows an example method 600 for determining one or more images of content being output. Method 600 may be implemented by the device 102, or the network device 116, or any combination thereof. For example, method 600 may be implemented by a user device comprising one or more of a smart television, a computer, a smartphone, a laptop, a tablet, or a set top box. At step 602, user input that causes output of content may be determined. For example, the user input may comprise one or more of a play command, a rewind command, a pause command, or a forward command. For example, a user may initiate a content item by providing a user input associated with a play command, wherein the content item may be output in response to receiving the play command. For example, the user input may be received by a user device (e.g., device 102, the network device 116, etc.), wherein the user device may cause the output of the content item on the user device. In an example, the user may also provide a user input associated with a rewind command, a pause command, or a forward command during the output of the content item.

At step 604, one or more time points may be determined. For example, the one or more time points may be determined by the user device (e.g., device 102, the network device 116, etc.). In an example, an application may output, at the one or more time points, data that identifies a content item. For example, the data may comprise metadata comprising data indicative of the content item. The one or more time points may be determined based on the user input. As an example, the one or more time points may be associated with each time a play command is received. As an example, the one or more time points may be associated with a time after the play command is received. As an example, the one or more time points may be associated with each time an additional input (e.g., rewind command, pause command, forward command, etc.) is received during the output of the content item.

At step 606, one or more images of the content being output may be determined. For example, one or more images of content being output on the user device may be determined by the user device (e.g., device 102, the network device 116, etc.). The one or more images of the content being output may be determined based on the one or more time points. In an example, the one or more images may be captured at the one or more time points. In an example, one or more screenshots of the content being output may be generated at the one or more time points. The one or more images may be determined based on the one or more screenshots.

At step 608, a content item being output by the application may be identified based on the one or more images. For example, the content item may be identified by the user device (e.g., device 102, the network device 116, etc.) based on the one or more images. For example, one or more screenshots may be analyzed to determine text data associated with the content item being output by the application. The text data may comprise one or more of one or more logos, text information, captions, or one or more content descriptors. The content item being output may be identified based on the text data. For example, an image of content may be analyzed using OCR techniques to identify the text data output with the content, and thus, identify the content item being output. For example, an OCR algorithm may compare the identified text data output in the content with a library of content to identify the content item being output by the application. In an example, the library of content may be stored on the user device (e.g., device 102, the network device 116, etc.), in a cloud computing device, in a database, etc. As an example, viewing history information may be determined. The viewing history information may be updated with the identification of the content being output. In an example, a content recommendation may be provided based on the identification of the content being output. In an example, viewing history information considered by a content recommendation profile may be updated based on the identification of the content being output.

Figure 7:
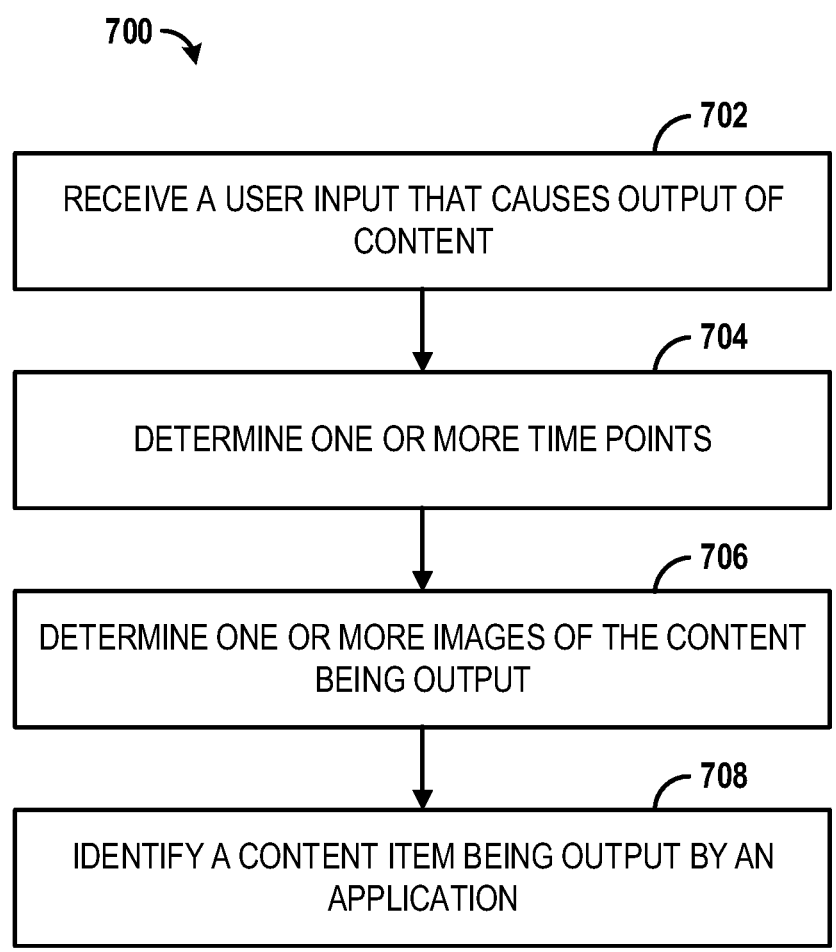
FIG. 7 shows a flowchart of an example method.

FIG. 7 shows an example method 700 for determining one or more images of content being output. Method 700 may be implemented by the device 102, or the network device 116, or any combination thereof. For example, method 700 may be implemented by a user device comprising one or more of a smart television, a computer, a smartphone, a laptop, a tablet, or a set top box. At step 702, a user input that causes output of content may be received. The user input may comprise one or more of a power on/off command, a content item initiation command, an interaction with a content item, an interaction with an application, or a command associated with exiting the application. For example, the user input may be received by a user device (e.g., device 102, the network device 116, etc.). For example, a user may provide an input that causes the user device to power on, wherein a content item may be initially output as the user device powers on.

At step 704, one or more time points may be determined. For example, the one or more time points may be determined by the user device (e.g., device 102, the network device 116, etc.). The one or more time points may be determined based on data associated with the content output at and/or during the user input. For example, the data associated with the content may comprise one or more of a type of content, a category of content, a genre of content, or an identifier of the content. In an example, an application may output, at the one or more time points, data that identifies a content item. For example, the data may comprise metadata comprising data indicative of the content item. As an example, the one or more time points may be determined based on a screenshot taken at a time associated with receiving the user input. For example, an image of content output at and/or during the user input may be determined based on the user input. An OCR technique may be performed on the image to determine the data associated with the content. For example, text data associated with the content being output may be identified using an OCR technique in order to determine the data associated with the application. For example, an OCR algorithm may compare the identified text output in the content with a library of content to identify the content output at and/or during the user input. In an example, the library of content may be stored on the user device (e.g., device 102, the network device 116, etc.), in a cloud computing device, in a database, etc. The text data may comprise one or more of one or more logos, text information, caption data, or one or more content descriptors. The data associated with the content output at and/or during the user input may be determined based on the text data. The one or more time points may be determined based on the OCR results of the image indicating the data associated with the content output at and/or during the user input. As an example, a quantity of user inputs associated with causing the output of the content may be determined based on the data associated with the content output at and/or during the user input. The one or more time points may be determined based on the quantity of user inputs. For example, a quantity of user inputs may be used in order to access the content, especially depending on the type of content being accessed. For example, if the content comprises linear content, a user may skip commercial content during the commercial breaks of the linear content. Thus, one or more of the quantity of user inputs may be used for determining images (e.g., screenshots) of the content being output as the user interacts with the content.

At step 706, one or more images of the content being output may be determined. For example, one or more images of content being output on the user device may be determined by the user device (e.g., device 102, the network device 116, etc.). The one or more images of the content being output may be determined based on the one or more time points. In an example, the one or more images may be captured at the one or more time points. In an example, one or more screenshots of the content being output may be generated at the one or more time points. The one or more images may be determined based on the one or more screenshots.

At step 708, a content item being output by the application may be identified based on the one or more images. For example, the content item may be identified by the user device (e.g., device 102, the network device 116, etc.) based on the one or more images. For example, one or more screenshots may be analyzed to determine text data associated with the content being output. The text data may comprise one or more of one or more logos, text information, captions, or one or more content descriptors. The content item being output may be identified based on the text data. For example, an image of content may be analyzed using OCR techniques to identify the text data output with the content, and thus, identify the content being output. For example, an OCR algorithm may compare the identified text data output in the content with a library of content to identify the content item being output by the application. In an example, the library of content may be stored on the user device (e.g., device 102, the network device 116, etc.), in a cloud computing device, in a database, etc. As an example, viewing history information may be determined. The viewing history information may be updated with the identification of the content being output. In an example, a content recommendation may be provided based on the identification of the content being output. In an example, viewing history information considered by a content recommendation profile may be updated based on the identification of the content being output.

Figure 8:
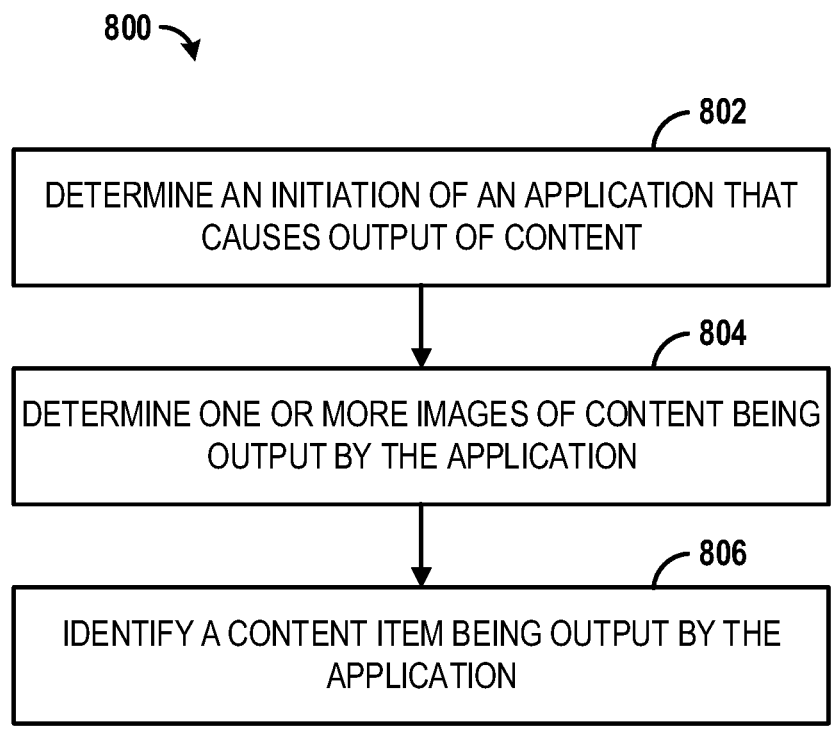
FIG. 8 shows a flowchart of an example method.

FIG. 8 shows an example method 800 for determining one or more images of content being output. Method 800 may be implemented by the device 102, or the network device 116, or any combination thereof. For example, method 800 may be implemented by a user device comprising one or more of a smart television, a computer, a smartphone, a laptop, a tablet, or a set top box. At step 802, an initiation of an application that causes output of content may be determined. For example, the application may comprise one or more of a video streaming application, a game application, a social media application, a fitness application, or a service application. For example, the content being output by the application may comprise, one or more of a user interface, one or more options for selection, a menu, or one or more content items for selection. For example, a user input may be received that causes the initiation of the application. For example, a user device (e.g., device 102, network device 116, etc.) may receive the user input to initiate the application, wherein the application may cause the content to be output on the user device.

At step 804, one or more images of the content being output may be determined. For example, one or more images of content being output may be determined by the user device (e.g., device 102, the network device 116, etc.). The one or more images of the content being output may be determined at the initiation of the application, a duration after the initiation of the application, or an initiation of an output of a content item associated with the application. In an example, the one or more images may be captured at the initiation of the application, a duration after the initiation of the application, or an initiation of an output of a content item associated with the application. In an example, one or more screenshots of the content being output may be generated at the initiation of the application, a duration after the initiation of the application, or an initiation of an output of a content item associated with the application. The one or more images may be determined based on the one or more screenshots.

At step 806, a content item being output by the application may be identified based on the one or more images. For example, the content item may be identified by the user device (e.g., device 102, the network device 116, etc.) based on the one or more images. For example, one or more screenshots may be analyzed to determine text data associated with the content item output by the application. The text data may comprise one or more of one or more logos, text information, captions, or one or more content descriptors. The content item being output may be identified based on the text data. For example, an image of content may be analyzed using OCR techniques to identify the text data output with the content, and thus, identify the content item being output by the application. For example, an OCR algorithm may compare the identified text data output in the content with a library of content to identify the content item being output by the application. In an example, the library of content may be stored on the user device (e.g., device 102, the network device 116, etc.), in a cloud computing device, in a database, etc. As an example, viewing history information may be determined. The viewing history information may be updated with the identification of the content being output. In an example, a content recommendation may be provided based on the identification of the content being output. In an example, viewing history information considered by a content recommendation profile may be updated based on the identification of the content being output.

Figure 9:
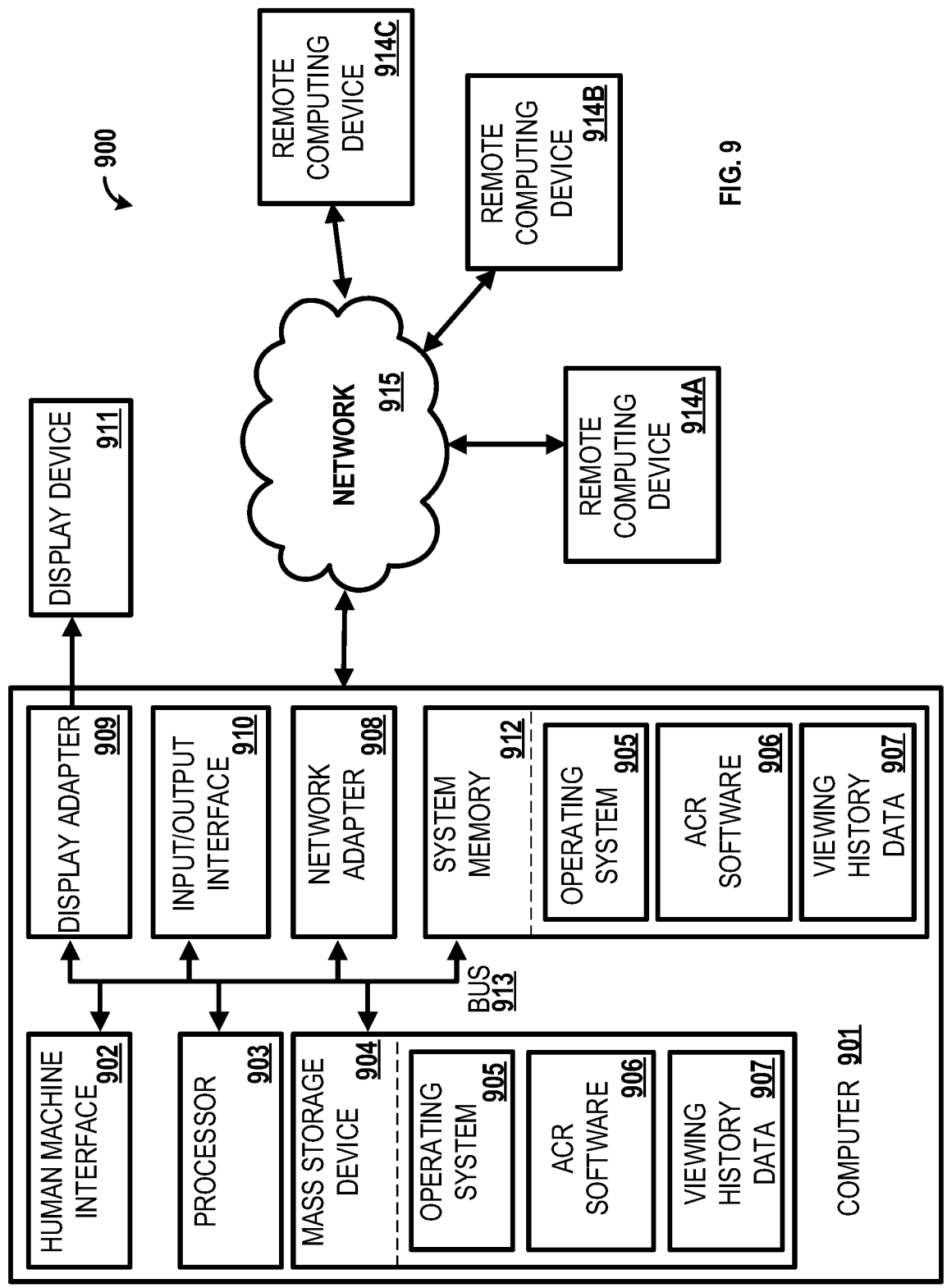
FIG. 9 shows a block diagram of an example system and computing device.

The methods and systems can be implemented on a computer 901 as illustrated in FIG. 9 and described below. By way of example, computing device 104, device 102, and/or the network device 116 of FIG. 1 can be a computer 901 as illustrated in FIG. 9. Similarly, the methods and systems disclosed can utilize one or more computers to perform one or more functions in one or more locations. FIG. 9 is a block diagram illustrating an example operating environment 900 for performing the disclosed methods. This example operating environment 900 is only an example of an operating environment and is not intended to suggest any limitation as to the scope of use or functionality of operating environment architecture. Neither should the operating environment 800 be interpreted as having any dependency or requirement relating to any one or combination of components illustrated in the example operating environment 900.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media such as memory storage devices.

Further, one skilled in the art will appreciate that the systems and methods disclosed herein can be implemented via a general-purpose computing device in the form of a computer 901. The computer 901 can comprise one or more components, such as one or more processors 903, a system memory 912, and a bus 913 that couples various components of the computer 901 comprising the one or more processors 903 to the system memory 912. The system can utilize parallel computing.

The bus 913 can comprise one or more of several possible types of bus structures, such as a memory bus, memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and one or more of the components of the computer 901, such as the one or more processors 903, a mass storage device 904, an operating system 905, ACR software 906, viewing history data 907, a network adapter 908, the system memory 912, an Input/Output Interface 910, a display adapter 909, a display device 911, and a human machine interface 902, can be contained within one or more remote computing devices 914A-914C at physically separate locations, connected through buses of this form, in effect implementing a fully distributed system.

The computer 901 typically comprises a variety of computer readable media. Examples of readable media can be any available media that is accessible by the computer 901 and comprises, for example and not meant to be limiting, both volatile and non-volatile media, removable and non-removable media. The system memory 912 can comprise computer readable media in the form of volatile memory, such as random access memory (RAM), and/or non-volatile memory, such as read only memory (ROM). The system memory 912 typically can comprise data such as the device identifier data 907 and/or program modules such as the operating system 905 and the ACR software 906 that are accessible to and/or are operated on by the one or more processors 903.

In another aspect, the computer 901 can also comprise other removable/non-removable, volatile/non-volatile computer storage media. The mass storage device 904 can provide non-volatile storage of computer code, computer readable instructions, data structures, program modules, and other data for the computer 901. For example, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, such as, by way of example, the operating system 905 and the ACR software 906. One or more of the operating system 905 and the ACR software 906 (or some combination thereof) can comprise elements of the programming and the ACR software 906. The viewing history data 907 can also be stored on the mass storage device 904. The viewing history data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 915.

In another aspect, the user can enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 903 via the human machine interface 902 that is coupled to the bus 913, but can be connected by other interface and bus structures, such as a parallel port, game port, an IEEE 1394 Port (also known as a Firewire port), a serial port, a network adapter 908, and/or a universal serial bus (USB).

In yet another aspect, the display device 911 can also be connected to the bus 913 via an interface, such as the display adapter 909. It is contemplated that the computer 901 can have more than one display adapter 909 and the computer 901 can have more than one display device 911. For example, the display device 911 can be a monitor, an LCD (Liquid Crystal Display), light emitting diode (LED) display, television, smart lens, smart glass, and/or a projector. In addition to the display device 911, other output peripheral devices can comprise components such as speakers (not shown) and a printer (not shown) which can be connected to the computer 901 via an Input/Output Interface 910. Any step and/or result of the methods can be output in any form to an output device. Such output can be any form of visual representation, comprising, but not limited to, textual, graphical, animation, audio, tactile, and the like. The display device 911 and the computer 901 can be part of one device, or separate devices.

The computer 901 can operate in a networked environment using logical connections to one or more remote computing devices 914A-914C. By way of example, a remote computing device 914A-914C can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914A-914C can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components can reside at various times in different storage components of the computing device 901, and are executed by the one or more processors 903 of the computer 901. An implementation of the ACR software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Example computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques comprise, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, such as: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as examples only, with a true scope and spirit being indicated by the following claims.

What is claimed is:

1. A method comprising:
   determining, by a device, an initiation of an application, wherein the application causes output of content;
   determining, based on data identifying the application, one or more time points, wherein the application, at the one or more time points, outputs data that identifies a content item;
   generating, at the one or more time points, one or more images of the content output by the application, wherein the one or more images are generated by an internal component of the device; and
   identifying, based on the one or more images, a content item being output by the application.

2. The method of claim 1, wherein the data identifying the application comprises one or more of a type of application, a classification of the application, or an identifier of the application.

3. The method of claim 1, wherein determining, based on the data identifying the application, the one or more time points comprises:
   determining, based on the initiation of the application, an image of the content output by the application; and
   determining, based on the image, the one or more time points.

4. The method of claim 1, wherein determining, based on the data identifying the application, the one or more time points comprises:
   determining, based on the data identifying the application, a quantity of user inputs associated with causing the output of the content; and
   determining, based on the quantity of user inputs, the one or more time points.

5. The method of claim 1, wherein the one or more time points comprises one or more of a time associated with the initiation of the application, a time associated with a duration after the initiation of the application, a time associated with an initiation of an output of a content item associated with the application, or a time associated with a user interaction of the application.

6. The method of claim 1, wherein identifying, based on the one or more images, the content item being output by the application comprises:
   determining, based on the one or more images, text data associated with the content output by the application; and
   identifying, based on the text data, the content item being output by the application.

7. The method of claim 6, wherein the text data comprise one or more of one or more logos, text information, captions, or one or more content descriptors.

8. The method of claim 1, further comprising:
   determining viewing history information; and
   updating the viewing history information with the identification of the content item being output by the application.

9. A method comprising:
   determining, by a device, a user input, wherein the user input causes output of content;
   determining, based on data identifying a type of user input of the user input, one or more time points, wherein an application, at the one or more time points, outputs data that identifies a content item;
   generating, at the one or more time points, one or more images of the content being output, wherein the one or more images are generated by an internal component of the device; and
   identifying, based on the one or more images, a content item being output by the application.

10. The method of claim 9, wherein the user input comprises one or more of a play command, a rewind command, a pause command, or a forward command.

11. The method of claim 9, wherein identifying, based on the one or more images, the content item being output by the application comprises:
    determining, based on the one or more images, text data associated with the content being output; and
    identifying, based on the text data, the content item being output by the application.

12. The method of claim 11, wherein the text data comprises one or more of one or more logos, text information, captions, or one or more content descriptors.

13. The method of claim 9, further comprising:
    determining viewing history information; and
    updating the viewing history information with the identification of the content item being output by the application.

14. A method comprising:
    receiving, at a device, a user input that causes output of content;
    determining, based on data identifying the content being output, one or more time points, wherein an application, at the one or more time points, outputs data that identifies a content item;

generating, at the one or more time points, one or more images of the content being output, wherein the one or more images are generated by an internal component of the device; and identifying, based on the one or more images, a content item being output by the application.

15. The method of claim 14, wherein the data identifying the content being output comprises one or more of a type of content, a category of content, a genre of content, or an identifier of the content.

16. The method of claim 14, wherein determining, based on the data identifying the content being output, the one or more time points comprises:

determining, based on the user input, an image of the content being output; and determining, based on the image, the one or more time points.

17. The method of claim 14, wherein determining, based on the data identifying the content being output, the one or more time points comprises:

determining, based on the data identifying the content being output, a quantity of user inputs associated with causing the output of the content; and determining, based on the quantity of user inputs, the one or more time points.

18. The method of claim 14, wherein identifying, based on the one or more images, the content item being output by the application comprises:

determining, based on the one or more images, text data associated with the content being output; and identifying, based on the text data, the content item being output by the application.

19. The method of claim 18, wherein the text data comprise one or more of one or more logos, text information, captions, or one or more content descriptors.

20. The method of claim 14, further comprising: causing, based on the identification of the content item being output by the application, a content recommendation; or updating, based on the identification of the content item being output by the application, viewing history information considered by a content recommendation user profile.

* * * * *